UNITED STATES PATENT OFFICE.

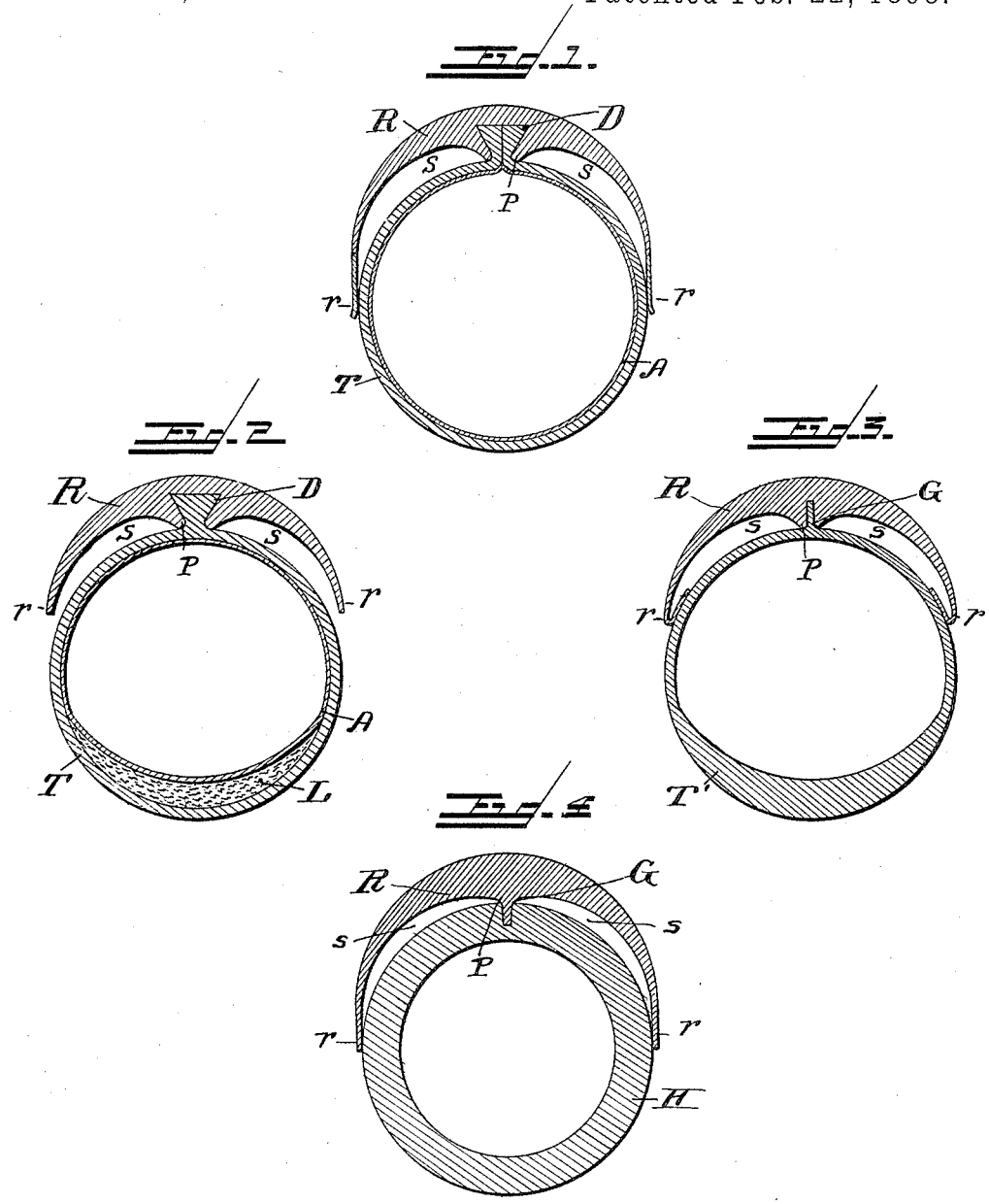

DAVID A. McKNIGHT, OF WASHINGTON, DISTRICT OF COLUMBIA.

ELASTIC TIRE FOR VEHICLES.

SPECIFICATION forming part of Letters Patent No. 599,516, dated February 22, 1898.

Application filed April 3, 1896. Serial No. 586,025. (No model.)

*To all whom it may concern:*

Be it known that I, DAVID A. McKNIGHT, a citizen of the United States, residing at Washington, in the District of Columbia, have invented certain new and useful Improvements in Elastic Tires for Vehicles; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to vehicle-wheels furnished with rubber or other elastic tubular tires; and it consists, primarily, in providing a channeled rim with a central normally narrow seat for one or both tubes, whereby when the tire is in place there shall be on either side of its seat at the bottom of the channel spaces between the tube and the rim, and in so constructing the sides of the rim that they shall prevent undue rolling of the tire without too closely engaging it, whereby when the wheel is running under load the tire shall have a reciprocating motion between the rim sides over its point of contact with the ground.

My invention also consists in the construction of the tire and of the rim hereinafter more particularly described and claimed.

The drawings illustrate in section what is at present my preferred construction of tire and rim; but I do not confine my invention to any of the forms there shown.

Figures 1 and 2 are double-tube pneumatic bicycle-tires having the inner tube A and the outer tube T, the outer tube having a projection on its inner side adapted to fit the dovetail groove D in rim R, wherewith it is secured in place. Fig. 3 is a pneumatic bicycle-tire having a single tube T', provided on its inner side with a small tongue adapted to fit into groove G of the rim. Fig. 4 is a bicycle-tire of the hose-pipe variety having tube H, provided on its inner side with groove G, adapted to receive a small tongue projecting from rim R, which are the equivalents of the tongue and groove shown in Fig. 3.

In each figure, P is a peripheral rib centrally located in the incurved face or channel of the rim, and upon this rib the tube rests as a seat, and to it it is suitably secured by a tongue-and-groove joint or otherwise. Rib P is shown as an integral part of the rim, and this form I at present prefer; but it is obvious that there may be other forms of rib which would each be its equivalent—as, for example, the rib on the tire shown in Fig. 3. Rib P is flanked by spaces S, into which the inner side of the tube sinks when the rim is pressed down on it.

I prefer a tire whose tread-tube, or the tube which comes in contact with the ground, is centrally seated in the channel; but my invention is also adapted to a tire whose inner tube alone is so seated. By a "tubular" tire I mean a hollow tire, whether its tube or tubes be cylindrical in section or otherwise shaped.

In the several figures of the drawings the sides of rim R are shown as longer than those of the ordinary bicycle-rim, their edges $r$, which for the purpose of this case I term "flanges," approximating or loosely engaging the intermediate sides of the tire, or those parts of the tire between the tread and rim portions, as ordinarily understood. These flanges prevent the tire from undue rolling and are made necessary by the existence of spaces S, which deprive the tire of lateral support; but since my invention requires the rim when weighted to compress the inner side of the tire and therefore to have a reciprocating movement relative to the tire (or the tire to have a reciprocating movement relative to the rim) when the wheel is running under load it is essential that flanges $r$ shall not bind the intermediate sides of the tire. Hence in Figs. 1 and 3 they are shown as provided with springs, which when the rim is under pressure will yield sufficiently to permit the requisite in-and-out movement. In Fig. 4 they are shown as quite thin and therefore slightly flexible, sufficiently so for a hose-pipe tire. In Fig. 1 they do not touch the tire except when it rolls.

I am aware that it has heretofore been proposed to centrally seat a tubular tire between the sides of a wheel-rim, so that there shall be spaces on either side of the tire-seat, and that into such spaces the inner side of the tire shall dilate or expand under the increased air-pressure when the wheel is under load; but to be operative such a tire must be held by the rim-flanges substantially immovable at some part of its intermediate sides. Its operative principle is therefore different from that of my primary invention, and I accordingly disclaim it.

With my invention when the wheel is under load, the inner portion of the tire is compressed by the rim precisely as its tread portion is compressed by the ground. Hence a greater degree of resilience is obtained than with the arrangement of tire and rim in ordinary use. And this permits the use of means for rendering the tread portion puncture-proof, which must always decrease the resilience of that side of a tire without lessening its required resilience as a whole. Fig. 3 shows the tread portion thickened for such purpose, and Fig. 2 shows a puncture-proof armor L protecting it. Obviously by transversely thickening or armoring the tread portion to a sufficient extent its flexibility may be decreased until it is substantially non-elastic or rigid, when it will no longer be compressed under load; but with my invention such a tire would on the whole run better, because there would be less friction at its point of contact with the ground and substantially no friction at its point of contact with the rim-seat. Clearly the kind and quality of the armor are not essential to my primary invention, and they may therefore be varied as desired.

Having thus fully described my invention, what I claim, and desire to secure by Letters Patent, is—

1. The vehicle-wheel rim, the elastic tubular tire having a flexible rim portion, the rib interposed between the rim and the tire, the spaces on either side of the rib when the tire is in place and not under load, and the flanges for loosely engaging the intermediate sides of the tire, substantially as and for the purposes described.

2. The vehicle-wheel rim having a channeled face, the elastic tubular tire having a flexible rim portion, the central seat for the tire and spaces on either side thereof between the bottom of the channel and the tire when the tire is in place and not under load, and the elastic flanges for engaging the intermediate sides of the tire, substantially as and for the purposes described.

3. An elastic tubular tire having a flexible rim portion and a tread portion less flexible than its rim portion in combination with a vehicle-wheel rim having a channeled face and side flanges and in the channel a central seat for the tire and spaces on either side thereof at the bottom of the channel when the tire is in place and not under load, the whole being so arranged that the flanges shall loosely engage the intermediate sides of the tire, whereby they shall have a reciprocating motion relative to each other, when the wheel is running under load, substantially as and for the purposes described.

4. An elastic tubular tire having a flexible rim portion and a non-flexible or rigid tread portion in combination with a vehicle-wheel rim having a channeled face and side flanges and in the channel a seat for the tire and spaces on either side thereof at the bottom of the channel when the tire is in place and not under load, the whole being so arranged that the flanges shall loosely engage the intermediate sides of the tire, whereby they shall have a reciprocating motion relative to each other, when the wheel is running under load, substantially as and for the purposes described.

5. An elastic tubular tire having a flexible rim portion and an armored tread portion in combination with a vehicle-wheel rim having a channeled face and side flanges and in the channel a central seat for the tire and spaces on either side thereof at the bottom of the channel when the tire is in place and not under load, the whole being so arranged that the flanges shall loosely engage the intermediate sides of the tire, whereby they shall have a reciprocating motion relative to each other, when the wheel is running under load, substantially as and for the purposes described.

6. The vehicle-wheel rim and an elastic tubular tire having a flexible rim portion in combination with the central rib interposed between the rim and the tread-tube of the tire, the rib alone supporting the tire and having spaces on either side thereof when the tire is in place and not under load, substantially as and for the purposes described.

7. An elastic tubular tire having a flexible rim portion in combination with a vehicle-wheel rim having a channeled face, a rib longitudinally placed therein as a seat for the tread-tube of the tire, a space on each side of the rib when the tire is in place and not under load, and means for securing the tire to the rib, substantially as and for the purposes described.

8. The tubular tire and the rib interposed between the rim and the tire as a seat for the tire in combination with a tongue-and-groove joint for securing the tire to the rib, substantially as and for the purposes described.

9. An elastic tubular tire having a flexible rim portion and a groove in the median line thereof, a wheel-rim having a channeled face and projecting therefrom a tongue adapted to fit into said groove, and a space between the rim and tire on either side of the line of their junction when the tire is in place and not under load, substantially as and for the purposes described.

In testimony whereof I affix my signature in presence of two witnesses.

DAVID A. McKNIGHT.

Witnesses:
E. H. SHUSTER,
WM. H. DE LACY.